United States Patent Office.

SIGISMUND BEER, OF NEW YORK, N. Y.

*Letters Patent No. 73,565, dated January 21, 1868.*

---

IMPROVED PROCESS FOR SEASONING AND PRESERVING WOOD.

---

*The Schedule referred to in these Letters Patent and making part of the same.*

---

TO ALL WHOM IT MAY CONCERN:

Be it known that I, SIGISMUND BEER, of the city, county, and State of New York, have discovered a new Process for Seasoning and Preserving Wood; and I hereby declare that the following is a full, clear, and exact description thereof.

Wood freshly cut is full of sap, composed of hygroscopic and very perishable organic substances. Heretofore, the idea has been, in seasoning and preserving wood, to wash out these substances, or to chemically combine and convert them into more durable compounds. Washing by steam only removes matter having great affinity for water, and soluble therein, leaving those that coagulate by the action of steam to fill the pores and stop further action. The chemical conversion of these substances is commonly produced by metallic salts, which combine with them, forming insoluble compounds of more durability. But this action is necessarily limited to the exterior, as deep impregnation is stopped by the newly-formed products. Moreover, the cost is high, and the salts more or less injuriously affect the wood-substance.

My discovery consists in simply treating the wood with a boiling solution of borax in water, which easily and effectually dissolves and removes all those perishable substances, without injuriously affecting the wood-fibre, which, on the contrary, becomes harder, impregnable to water, vermin-proof, perfectly indifferent to the moisture or dryness of the atmosphere, and almost incombustible.

The process and operation are as follows: In a tank, of wood or iron, I prepare a saturated or nearly saturated solution of borax in water, sufficient to cover the wood. I then raise the temperature, by steam or otherwise, to the boiling-point, and keep it there from two to twelve hours, according to the porosity and thickness of the wood. I then repeat this operation in a freshly-concentrated solution of borax in water, but immersing the wood only half as long as before. The wood is then taken out, and, as soon as dry, it is ready for use, if its hardness and discolor are not objectionable, or it may be several times washed in boiling water, which will extract the absorbed borax in connection with the colored matter, and restore its former color and appearance, more or less, at will.

It is not necessary to use a very strong solution, but I prefer it on account of the facility for reusing it.

Simple as my process is, it may be advantageously altered in some cases. When thick lumbers are to be treated, it is well to steam them thoroughly in the ordinary way, and place them in the tank while still warm and wet. The denser and heavier liquid of borax solution will more quickly penetrate the pores of the wood, and shorten the operation considerably.

If it be desirable to impregnate the wood with tar, coal-oil, or like substances, they are easily applied, after the wood has been thoroughly dried.

If it be desirable to make the wood perfectly water-tight, shellac, or other gum, or resin, or substance soluble in a boiling solution of borax, and insoluble, after drying, in cold water, may be added to the liquid of the second operation.

What I claim, and desire to secure by Letters Patent, is—

Seasoning, preserving, and purifying wood, by extracting its perishable matters, without injuring the wood-substance, and associating therewith a durable and antiseptic substance, which makes it harder, water-proof, indifferent to atmospheric changes, and less combustible, by the process above described, in which borax or some other borate or boracic acid, or a like compound, is employed, substantially as and for the purposes specified.

SIGISMUND BEER.

Witnesses:
S. J. GORDON,
G. H. COLLINS.